US009900208B2

(12) United States Patent
Kim et al.

(10) Patent No.: US 9,900,208 B2
(45) Date of Patent: Feb. 20, 2018

(54) PROTECTION SWITCHING MANAGEMENT APPARATUS AND METHOD FOR EFFECTIVE USE OF RESOURCES IN MULTILAYER OR MULTI-DOMAIN

(71) Applicant: ELECTRONICS AND TELECOMMUNICATIONS RESEARCH INSTITUTE, Daejeon (KR)

(72) Inventors: Dae Ub Kim, Daejeon (KR); Sun Me Kim, Daejeon (KR); Sung Hyuk Byun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 76 days.

(21) Appl. No.: 15/140,712

(22) Filed: Apr. 28, 2016

(65) Prior Publication Data
US 2017/0019292 A1   Jan. 19, 2017

(30) Foreign Application Priority Data

Jul. 14, 2015  (KR) .......................... 10-2015-0099509
Oct. 12, 2015  (KR) .......................... 10-2015-0142333

(51) Int. Cl.
*H04L 12/24*   (2006.01)
*H04L 12/939*   (2013.01)
*H04L 12/707*   (2013.01)

(52) U.S. Cl.
CPC ...... *H04L 41/0663* (2013.01); *H04L 41/0668* (2013.01); *H04L 45/22* (2013.01); *H04L 49/55* (2013.01)

(58) Field of Classification Search
None
See application file for complete search history.

(56) References Cited

U.S. PATENT DOCUMENTS

| 2002/0172149 | A1* | 11/2002 | Kinoshita | ............... H04L 12/14 370/216 |
| 2013/0156416 | A1 | 6/2013 | Kim et al. | |
| 2014/0219080 | A1 | 8/2014 | Kim et al. | |
| 2014/0307538 | A1* | 10/2014 | Iovanna | ................. H04L 45/64 370/218 |
| 2015/0098317 | A1 | 4/2015 | Cheung et al. | |

OTHER PUBLICATIONS

ITU-T G.873.1, "Series G: Transmission Systems and Media, Digital Systems and Networks Digital networks—Optical transport networks", Jul. 2011.

(Continued)

*Primary Examiner* — Christine Duong
(74) *Attorney, Agent, or Firm* — LRK Patent Law Firm

(57) ABSTRACT

A protection switching management apparatus and method for effective use of resources in a multilayer or a multi-domain. The protection switching management method may include receiving an adaptation request from a network component included in an upper layer, determining whether to apply protection switching to a layer based on the received adaptation request, and setting a protection path in the layer based on a result of the determining.

9 Claims, 7 Drawing Sheets

(56) References Cited

OTHER PUBLICATIONS

ITU-T G.8031_Y.1342, "Series G: Transmission Systems and Media, Digital Systems and Networks Packet over Transport aspects—Ethernet over Transport aspects, Series Y: Global Information Infrastructure, Internet Protocol Aspects and Next-Generation Networks", Jan. 2015.

ITU-T G.8131_Y.1382, "Series G: Transmission Systems and Media, Digital Systems and Networks Packet over Transport aspects—MPLS over Transport aspects, Series Y: Global Information Infrastructure, Internet Protocol Aspects and Next-Generation Networks", Jul. 2014.

* cited by examiner

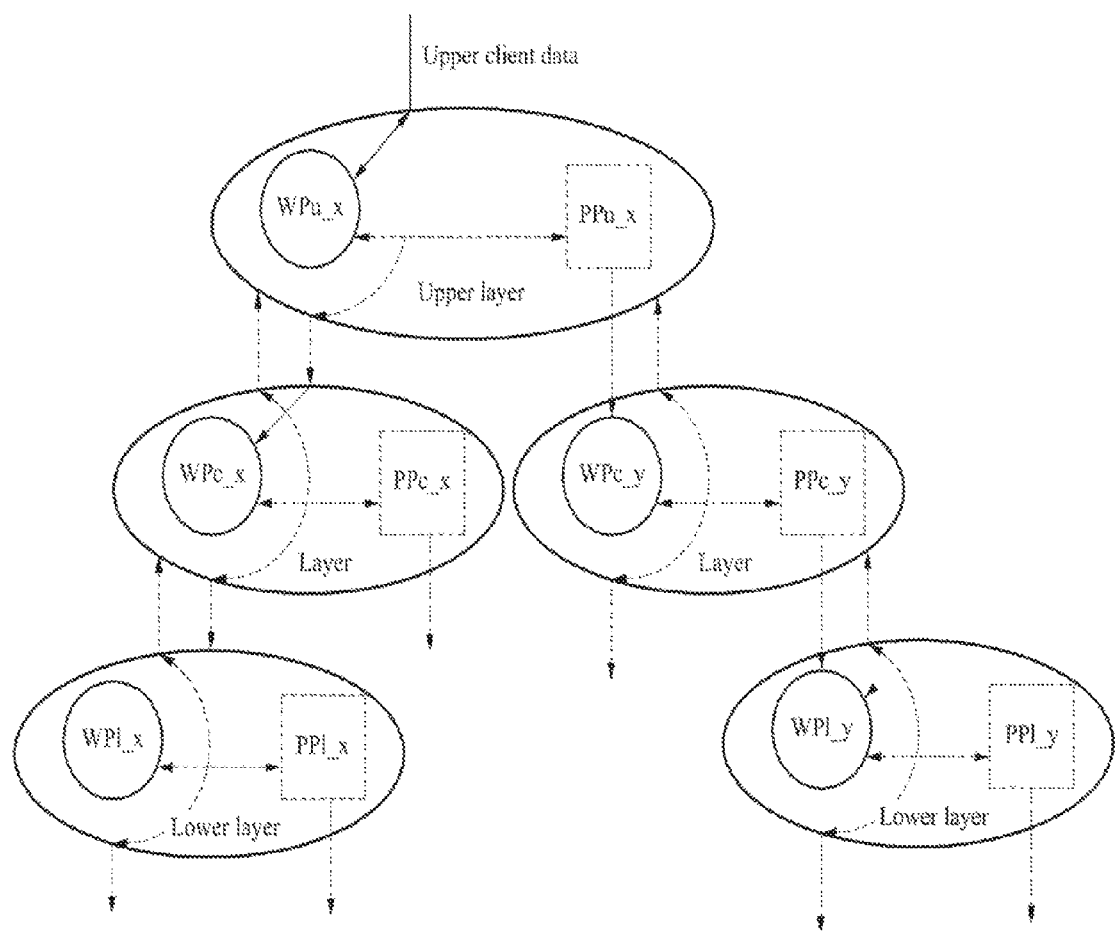

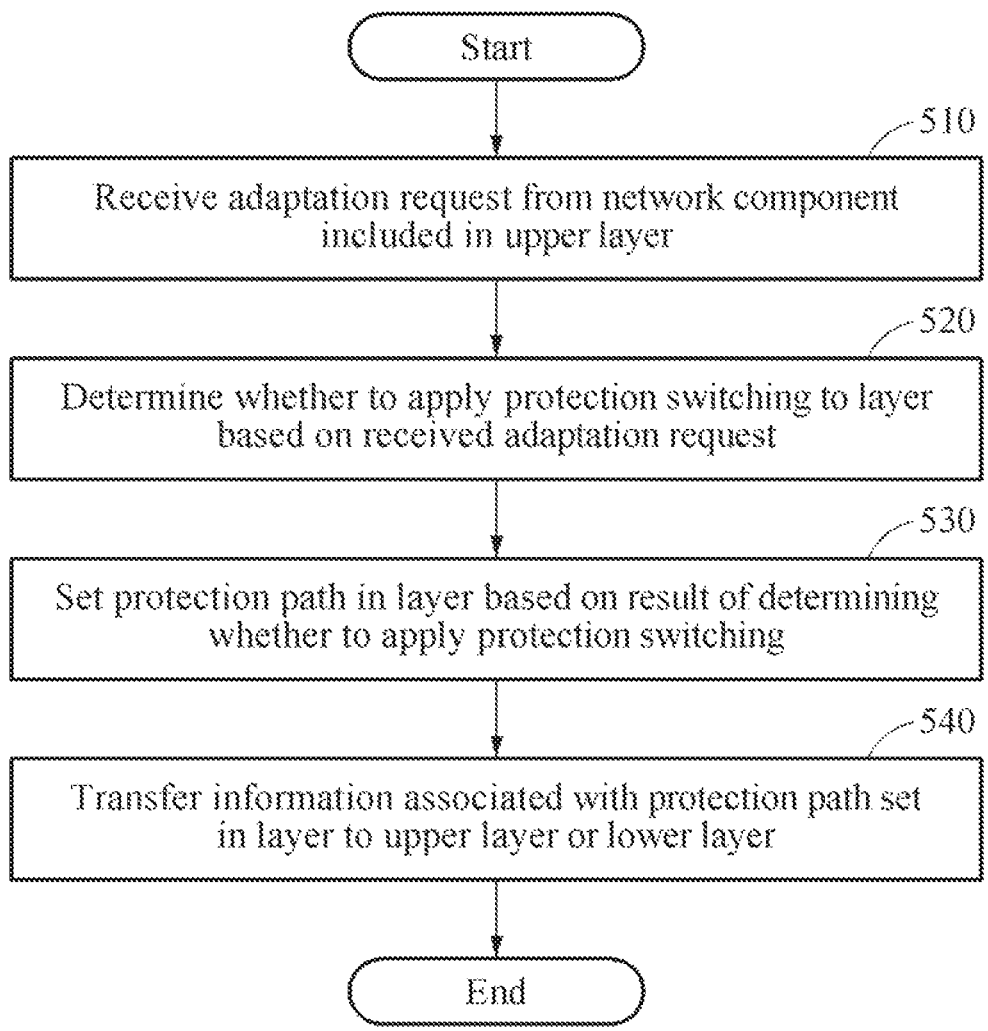

PROTECTION SWITCHING MANAGEMENT APPARATUS AND METHOD FOR EFFECTIVE USE OF RESOURCES IN MULTILAYER OR MULTI-DOMAIN

CROSS-REFERENCE TO RELATED APPLICATION

This application claims the priority benefit of Korean Patent Application No. 10-2015-0099509 filed on Jul. 14, 2015, and Korean Patent Application No. 10-2015-0142333 filed on Oct. 12, 2015, in the Korean intellectual Property Office, the disclosures of which are incorporated herein by reference.

BACKGROUND

1. Technical Field

Embodiments relate to a protection switching management apparatus and method for effective use of resources in a multilayer or multi-domain, and more particularly, to a protection switching management apparatus and method that cost-effectively applies a protection switching function to a network in which multiple layers or multiple domains interwork with one another.

2. Description of the Related Art

A protection path may be set in preparation for a fault occurring in a main path through which a packet is transmitted. In a normal operation of the main path, the protection path may not be used. However, in response to a fault occurring in the main path, a transmission path may be switched from the main path to the protection path to transmit the packet. For the switching to the protection path, the protection path may be activated first. To connect two successive network components among network components in the protection path, a multiplexing structure of an upper layer may be set.

Current connection-oriented transport network technology may include operations, administration, and maintenance (OAM) of a traditional circuit-based synchronous digital hierarchy (SDH), and a circuit-based optical transport network (OTN) and a wavelength division multiplexing (WDM) network based on protection switching technology. By developing packet transport technology that applies technology for implementing such a highly-trusted network, the highly-trusted network may expand into a field of Ethernet and multiprotocol label switching-transport profile (MPLS-TP).

Current systems may be configured by integrating such technologies and a transport function. Thus, in each domain applying the same transport technology, a layer may be subdivided into sub-layers and managed for each sub-layer.

For example, sub-layering a virtual local area network (VLAN) and a virtual extensible local area network (Vx-LAN) may be possible using Q-in-Q technology in Ethernet, and, in an OTN, subdividing an optical channel data unit (ODU) trail may be possible and layering the ODU trail may be possible using multiplexing.

Traditional technologies may determine whether to set a protection path based on information associated with an available resource of each layer, and thus there is a desire for a method to prevent additional setting of an overlapping protection segment between layers.

SUMMARY

An aspect provides a protection switching management apparatus and method for effective use of resources in a multilayer or a multi-domain and provides, more particularly, a protection switching management apparatus and method that applies, effectively in terms of costs, a protection switching function in a network in which multiple layers or multiple domains interwork with one another.

According to an aspect, there is provided a protection switching management method including receiving an adaptation request from a network component included in an upper layer, determining whether to apply protection switching to a layer that is lower than the upper layer based on the received adaptation request, and setting a protection path in the layer based on a result of the determining.

The determining may include determining whether to apply the protection switching to the layer based further on request information received from the upper layer in addition to the received adaptation request. The request information may be associated with an available resource of the upper layer required for applying the protection switching.

The request information may include a bandwidth of the upper layer, information as to whether a protection switching function is provided to the upper layer, path segment information of the upper layer, ultimate capacity information indicating whether the upper layer accommodates simultaneous protection switching, and forced request information to forcefully set the protection path in the layer.

The determining may include preferentially applying the protection switching to the upper layer over the layer, and applying the protection switching to the layer when the number of protection switching simultaneously accommodated by the upper layer exceeds the number of protection switching corresponding to the ultimate capacity information.

The determining may include determining whether to apply the protection switching to the layer based further on ultimate capacity information of each of the upper layer and the layer based on whether the protection switching function is provided to the upper layer and the layer and on an adaptation request path of the upper.

When the protection switching function is not provided to the layer and a lower layer to which the protection switching function is provided exists, the setting may include setting a protection path in the lower layer.

The protection switching management method may further include transferring information associated with the protection path set in the layer to the upper layer or the lower layer.

According to another aspect, there is provided a protection switching management apparatus including a receiver configured to receive an adaptation request from a network component included in an upper layer, a processor configured to determine whether to apply protection switching to a layer based on the received adaptation request, and set a protection path in the layer based on a result of the determining, and a storage configured to store information associated with the set protection path.

The processor may determine whether to apply the protection switching to the layer based further on request information received from the upper layer in addition to the received adaptation request. The request information may be associated with an available resource of the upper layer required for applying the protection switching.

The processor may preferentially apply the protection switching to the upper layer over the layer, and apply the protection switching to the layer when the number of protection switching simultaneously accommodated by the upper layer exceeds the number of protection switching corresponding to ultimate capacity information.

The processor may determine whether to apply the protection switching to the layer based further on ultimate capacity information of each of the upper layer and the layer based on whether a protection switching function is provided to the upper layer and the layer and on an adaptation request path of the upper layer.

When the protection switching function is not provided to the layer and a lower layer to which the protection switching function is provided exists, the processor may set a protection path in the lower layer.

The upper layer, the layer (or the corresponding layer), and the lower layer described herein are provided as an example of three layers being present, and the layer is lower than the upper layer and also upper than the lower layer.

BRIEF DESCRIPTION OF THE DRAWINGS

These and/or other aspects, features, and advantages of the present disclosure will become apparent and more readily appreciated from the following description of embodiments, taken in conjunction with the accompanying drawings of which:

FIG. 3 is a diagram illustrating a basic structure of protection switching in a multilayer network according to an embodiment;

FIG. 5 is a flowchart illustrating a protection switching management method according to an embodiment.

DETAILED DESCRIPTION

Figure 1:
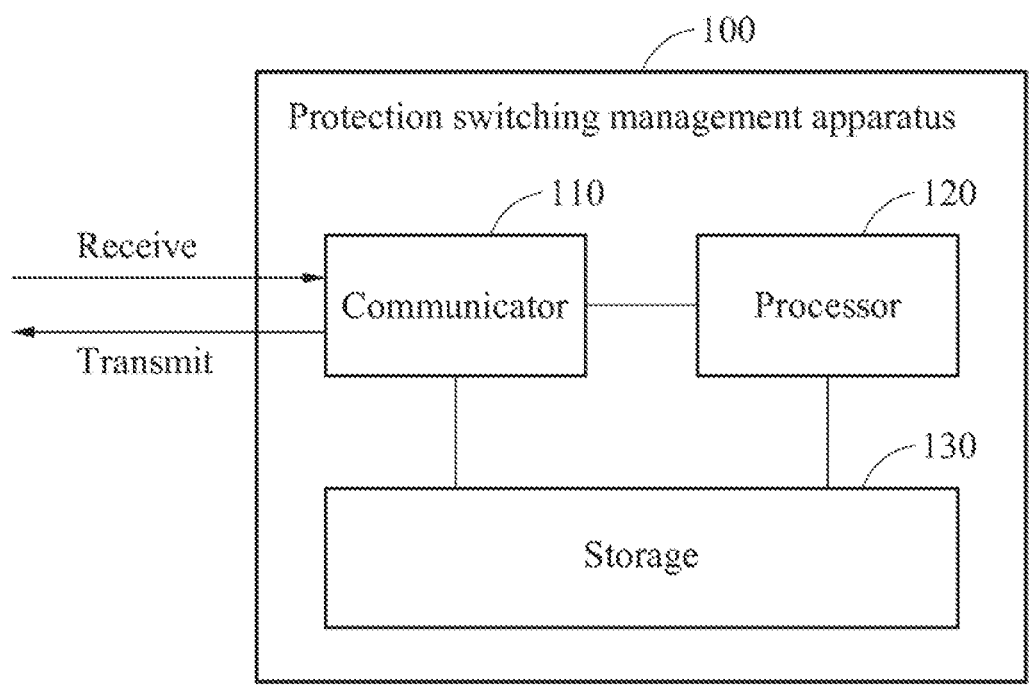
FIG. 1 is a diagram illustrating a protection switching management apparatus according to an embodiment.

Reference will now be made in detail to embodiments of the present disclosure, examples of which are illustrated in the accompanying drawings, wherein like reference numerals refer to the like elements throughout. Embodiments are described below to explain the present disclosure by referring to the figures.

FIG. 1 is a diagram illustrating a protection switching management apparatus 100 according to an embodiment.

Referring to FIG. 1, the protection switching management apparatus 100 includes a communicator 110, a processor 120, and a storage 130. Here, the protection switching management apparatus 100 may be a network component. The communicator 110 may receive an adaptation request from a network component included in an upper layer. The protection switching management apparatus 100 may be present in each layer, or a network component configured to perform integrated management to manage or control the communicator 110, the processor 120, and the storage 130 that are present in each layer.

The adaptation request indicates a request of the upper layer for adaptation or mapping to a layer that is lower than the upper layer in a network including multiple layers. For example, when a protection switching function is not provided to the layer, a protection path may not be set in the layer, but adapt to one working path in a lower layer and data may be transmitted and received by being added to a frame. Conversely, when the protection switching function is provided to the layer, both a working path and a protection path may be set in the layer. Here, the set working path and the set protection path may be considered a single protection group, and the upper layer may consider the protection group to be a lower path and adapt to the lower path.

That is, the adaptation request refers to a request to allow a traffic flow of the upper layer to map a traffic flow of the layer to be transferred in the network. Here, frame information of the upper layer, for example, a header and a payload (or data) of the upper layer, may be added to a payload (or data) of the frame of the layer, or a plurality of frames of the upper layer may be multiplexed and added to the payload (or data) of the layer. The adaptation request may include multiplexing information in which the frames of the upper layer are multiplexed, and may be a request to suitably form a header of the layer to complete a frame for normal communication of the layer. The adaptation request may indicate whether the frame information of the upper layer is communicated after the frame is completed through one path (for example, the working path) of the layer or the protection group (the working path and the protection path). A path through which the frame is transmitted and received may be selected from between the working path and the protection path by a protection switching operation depending on occurrence of a fault.

In detail, the adaptation request may be made by a network manager or a network management processor in a network management system (NMS) to a network component. That is, the network manager may make such an adaptation request directly to the network component using a common language infrastructure (CLI) or a graphical user interface (GUI) to configure a network including multiple layers, or the network management processor may make the adaptation request to the network component via the NMS.

Alternatively, the adaptation request may be made by a network management processor in a network component to a network processor including multiple layers.

Through such an adaptation request, the NMS or the network management processor in the network component may make a request to generate a suitable frame among multiple layers in a network including the multiple layers.

In an adaptation process through the adaptation request, when a bandwidth of the upper layer is smaller than a bandwidth of the layer, and a bandwidth of a working path of the layer is able to accommodate at least two bandwidths of the upper layer, all the at least two bandwidths of the upper layer may be accommodated by the layer and multiplexed, as necessary. When a difference between the bandwidth of the upper layer and the bandwidth of the layer is not multiplexed, the bandwidth of the upper layer may be mapped to the bandwidth of the layer without the multiplexing.

The processor 120 may determine whether to apply protection switching to the layer based on the adaptation request of the upper layer received through the communicator 110, and set a protection path in the layer based on a result of the determining. According to related technologies, the protection path may be unconditionally set when a network component included in the layer provides a protection switching function to the layer. However, according to an embodiment of the present disclosure, in consideration of a situation of a network including multiple layers, the protection path may not be set and only a working path may be set to adapt the upper layer and the layer.

Figure 2A:
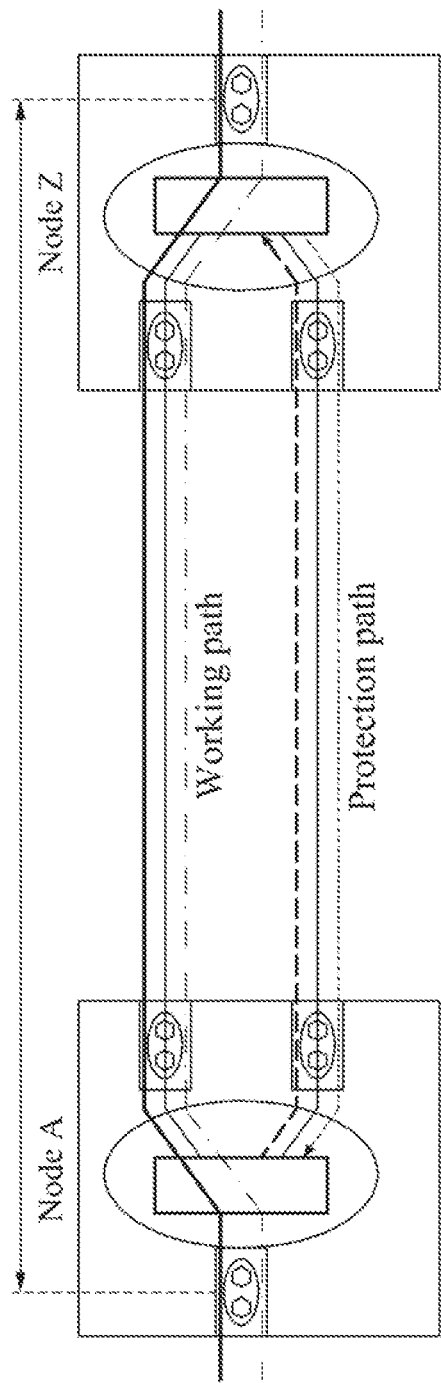
FIGS. 2A and 2B are diagrams illustrating types of protection switching according to an embodiment.

Here, when setting the protection path in the layer, the processor 120 may set the protection path using various options, for example, a 1+1 mode, a 1:1 mode, and an M:N mode. An example of the 1:1 mode may be illustrated as in FIG. 2A. In the 1:1 mode, data of the upper layer may be transmitted and received through one of a working path and a protection path, and the data may not be transmitted and received through the other remaining path.

Figure 2B:
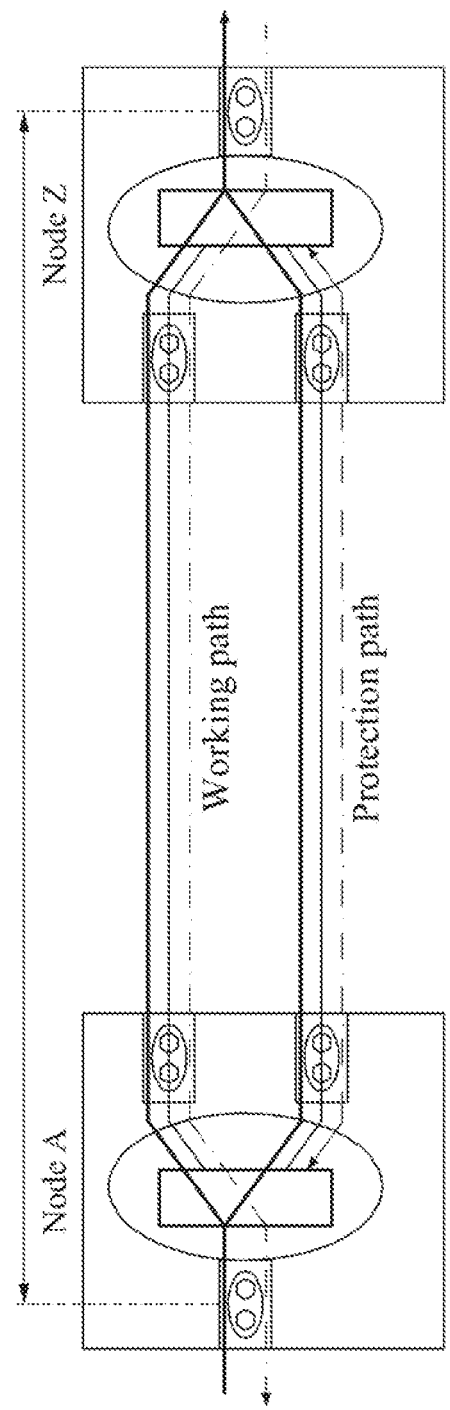

An example of the 1+1 mode may be illustrated as in FIG. 2B. In the 1+1 mode, data of the upper layer may be copied and the data may be transmitted and received through both the working path and the protection path of the layer. Here, data to be transmitted may be selected and processed through one of the working path and the protection path.

The M:N mode may be extended from the 1:1 mode. In the M:N mode, data may be transmitted by setting of a plurality of working paths and a plurality of protection paths.

The processor 120 may determine whether to apply the protection switching to the layer based on request information received from the upper layer in addition to the received adaptation request of the upper layer. Here, the request information received from the upper layer may be associated with an available resource of the upper layer required for applying the protection switching to the upper layer. In detail, the request information may include a bandwidth of the upper layer, information as to whether a protection switching function is provided to the upper layer, path segment information of the upper layer, ultimate capacity information indicating whether the upper layer is able to accommodate simultaneous protection switching, and forced request information to forcefully set the protection path in the layer.

Here, the path segment information may include information on a management point and a destination management point for each network layer, and information on an intermediate management point between the management point and the destination management point. In detail, the path segment information may include an identifier (ID) of each node in a path segment, a bandwidth of a physical path and a logical path, information on a physical slot and a port through which a path passes in each node, and path cost information of a path segment of each network layer.

In a basic network structure and an operations, administration, and management (OAM) function, a fault in the layer may simultaneously generate a fault event in the upper layer multiplexed through the adaptation request. The ultimate capacity information indicating whether the upper layer is able to accommodate simultaneous protection switching indicates a maximum number of protection switching that may be accommodated without exceeding an ultimate protection capacity of the upper layer in response to occurrence of such a fault event. Alternatively, the ultimate capacity information, which is an index for a network resource such as a bandwidth of the upper layer, may indicate an index value indicating that, since most of the bandwidth of the upper layer is already occupied for communications, a bandwidth and a network resource may not be allocated for an additional protection path. Also, the ultimate capacity information may be pre-designated information for an operator to artificially induce or restrict protection switching to be set in the upper layer or the lower layer, in addition to the bandwidth or the number of protection switching.

The ultimate capacity information may be managed for an entire end-to-end path and for each path segment of protection switching present in each network layer.

The processor 120 may effectively set the protection path. For example, the processor 120 may prevent setting an overlapping protection segment based further on path segment information of the upper layer and the layer even when a resource exists based on the request information associated with the available resource.

Here, since applying the protection switching to the upper layer is more effective in terms of costs, the processor 120 may allow the protection switching to be applied to the upper layer. When the number of protection switching of the upper layer exceeds the number of protection switching corresponding to the ultimate capacity of the upper layer, the processor 120 may not apply an additional protection switching to the upper layer, and forcefully apply the protection switching to the layer.

Dissimilarly, when a bandwidth of a path to which protection switching is applied to the layer, which is lower than the upper layer, is already broad, several paths of the upper layer to which the protection switching is already applied are multiplexed and adapt to the layer, and the protection section of the upper layer is equal to that of the layer, the processor 120 may cancel the protection switching function of the upper layer and delete the protection path of the upper layer to reduce the bandwidth used in the upper layer reaching close to the ultimate capacity and the number of protection switching, and thus may allow the upper layer to be effectively used.

An example of a basic protection switching structure for a multilayer network is illustrated in FIG. 3. In FIG. 3, a working path (WP) and a protection path (PP) are illustrated. The protection path may be set or not be set based on whether a protection switching function is provided to each layer or information associated with an available resource.

Figure 4A:
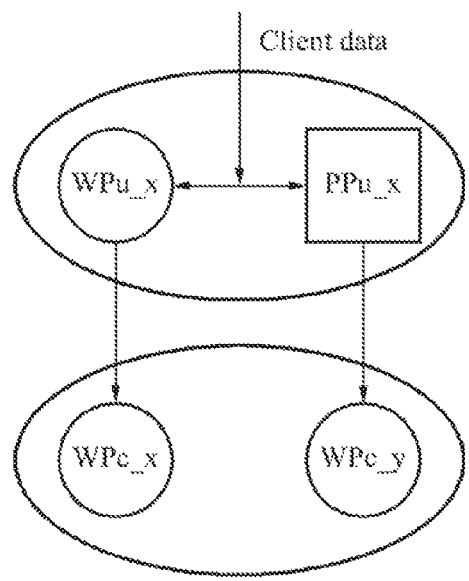
FIGS. 4A through 4D are diagrams illustrating examples of a process of setting protection switching according to an embodiment.

Examples of a process of setting protection switching are illustrated in FIGS. 4A through 4D. FIG. 4A illustrates an example of protection switching to be set when a protection switching function is provided only to an upper layer. As illustrated in FIG. 4A, since the protection switching function is provided to the upper layer and an available resource of the upper layer is sufficient, a protection path may be set along with a working path in the upper layer. Since the protection switching function is not provided to a layer that is lower than the upper layer, or an ultimate capacity of the layer is exceeded or a bandwidth is not sufficient despite the protection switching function being provided, working paths of the layer may adapt to each path of the upper layer.

Figure 4B:
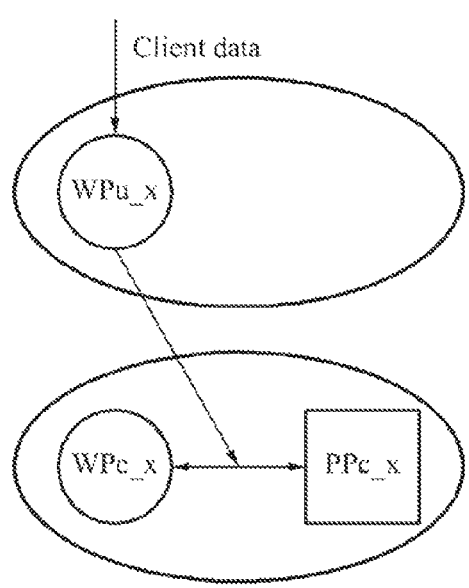

FIG. 4B illustrates an example of protection switching to be set when the protection switching function is provided only to the layer. As illustrated in FIG. 4B, since the protection switching function is provided to the layer and an available resource of the layer is sufficient, both a working path and a protection path of the layer may adapt to a path of the upper layer. It may also be applicable to a case in which a bandwidth for setting the protection switching function is not sufficient or the ultimate capacity is exceeded.

Figure 4C:
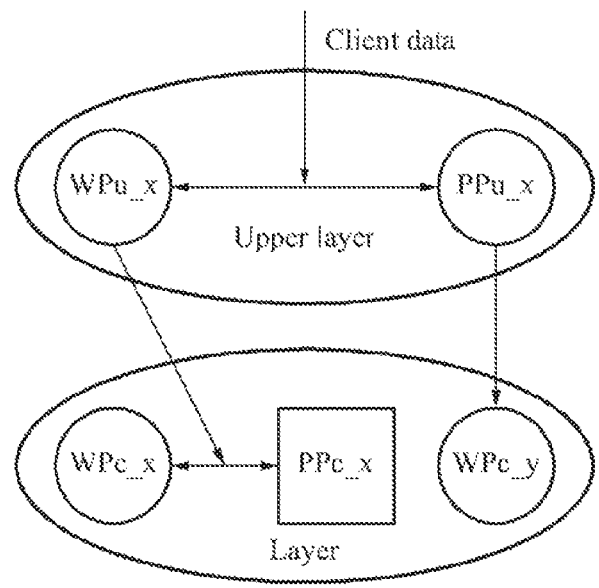

FIG. 4C illustrates an example of protection switching to be set when the protection switching function is provided to both the upper layer and the layer. As illustrated in FIG. 4C, protection switching is applied to both the two layers in response to a request to forcefully set a protection path in the layer for a working path of the upper layer. Here, by adapting only a working path of the layer to a protection path of the upper layer, setting an overlapping protection segment may be prevented.

Figure 4D:
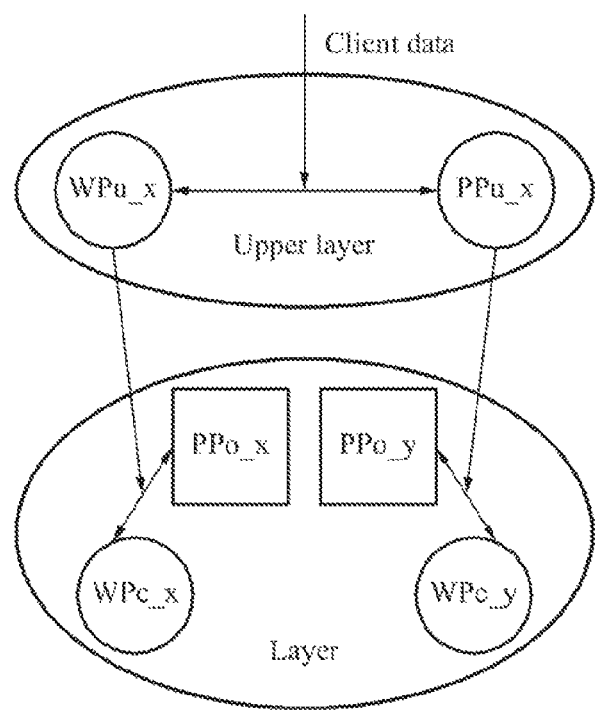

FIG. 4D illustrates another example of protection switching to be set when the protection switching function is provided to both the upper layer and the layer. As illustrated in FIG. 4D, protection paths may be unnecessarily set in the layer in response to a request to forcefully set a protection path in the layer for a working path and a protection path of the upper layer.

A process of setting a protection path in a layer by the processor 120 may be determined based on whether a protection switching function is provided to each of multiple layers and on ultimate capacity information indicating whether each layer is able to accommodate simultaneous protection switching based on an adaptation request path of an upper layer.

For example, when the protection switching function is provided to all interworking layers, for example, the upper layer and the layer that is lower than the upper layer, and the adaptation request path of the upper layer is a working path, a protection path may be set in the layer as described in the following.

1. When a protection path in an identical segment is set in the upper layer and an additional protection switching (or group) is allowed to be generated in the upper layer because the number of protection switching simultaneously accommodated by the upper layer is less than or equal to the number of protection switching corresponding to ultimate capacity of the upper layer, the processor 120 may set only a working path without setting a protection path in the layer. In such a case, the processor 120 may avoid setting an overlapping protection path in the layer, and perform protection switching in the upper layer. Subsequently, the processor 120 may transfer, to the upper layer, path setting information indicating that the protection path is not set in the layer but only the working path is set.

2. When a protection path in an identical segment is not set in the upper layer and an additional protection switching is allowed to be generated in the upper layer because the number of protection switching simultaneously accommodated by the upper layer is less than or equal to the ultimate capacity of the upper layer, the processor 120 may set only a working path without setting a protection path in the layer, and allow the upper layer to generate protection switching. In such a case, the processor 120 may transfer, to the upper layer, path setting information indicating that only the working path is set without setting the protection path in the layer to set the protection path in the upper layer.

3. When a protection path in an identical segment is not set in the upper layer and an additional protection switching is not allowed to be generated in the layer because the number of protection switching simultaneously accommodated by the layer exceeds the number of protection switching corresponding to an ultimate capacity of the layer, the processor 120 may set only a working path without setting a protection path in the layer. In such a case, the processor 120 may transfer, to the upper layer, path setting information indicating that only the working path is set without setting the protection path in the layer to set the protection path in the upper layer.

4. When an additional protection switching is not allowed to be generated because the number of protection switching simultaneously accommodated by both the upper layer and the layer exceeds the number of protection switching corresponding to the ultimate capacity, the processor 120 may not set a protection path in both the two layers. Here, the processor 120 may transfer, to a further upper layer that is upper than the upper layer or a lower layer that is lower than the layer, path setting information indicating that the protection path is not set both in the upper layer and the layer to set a protection path in the further upper layer or the lower layer.

For another example, when the protection switching function is provided to all the interworking layers, for example, the upper layer and the layer, and the adaptation request path of the upper layer is a protection path, a protection path may be set in the layer as described in the following.

1. Since both a working path and a protection path are previously set in the upper layer, the processor 120 may set only a working path to avoid overlapping protection of the layer with respect to the protection path of the upper layer. In such a case, the processor 120 may transfer, to the upper layer, path setting information indicating that only the working path is set without setting the protection path in the layer.

2. In response to a request to forcefully set a protection path in the layer, although both a working path and a protection path are previously set in the upper layer, the processor 120 may set the protection path along with a working path in the layer for the protection path of the upper layer. In such a case, the processor 120 may transfer, to the upper layer, path setting information indicating that the protection path is set in the layer.

3. When an additional protection switching is not allowed to be generated because the number of protection switching simultaneously accommodated by the layer exceeds the number of protection switching corresponding to the ultimate capacity of the layer, although both a working path and a protection path are previously set in the upper layer and a request to forcefully set a protection path in the layer is made, the processor 120 may set only a working path without setting the protection path in the layer. In such a case, the processor 120 may transfer, to the upper layer, path setting information indicating that the working path is set without setting the protection path in the layer.

In a case of a network including multiple layers, the processor 120 may manage (or verify) whether the adaptation request path of the upper layer or the further upper layer is a protection path, and may follow the process of setting a protection path described in the foregoing when the adaptation request path is the protection path.

For still another example, when the protection switching function is not provided to the upper layer and the protection switching function is provided to the layer, and the adaptation request path of the upper layer is a working path, a protection path may be set in the layer as described in the following.

1. When an additional protection switching is allowed to be generated because the number of protection switching simultaneously accommodated by the layer is less than or equal to the number of protection switching corresponding to the ultimate capacity of the layer, the processor 120 may set both a working path and a protection path in the layer. In such a case, the processor 120 may transfer, to the upper layer, path setting information indicating that both the working path and the protection path are set in the layer.

2. When an additional protection switching is not allowed to be generated because the number of protection switching simultaneously accommodated by the layer exceeds the number of protection switching corresponding to the ultimate capacity of the layer, the processor 120 may set only a working path without setting a protection path in the layer. In such a case, the processor 120 may transfer, to the upper layer, path setting information indicating that only the working path is set without setting the protection path in the layer to set a protection path in the upper layer.

Here, the processor 120 may transfer, to the further upper layer that is upper than the upper layer or the lower layer that is lower than the layer, path setting information indicating that the protection path is not set in both the layer and the upper layer to set a protection path in the further upper layer or the lower layer.

For yet another example, when the protection switching function is not provided to the layer and the protection switching function is provided to the lower layer, and the adaptation request path of the upper layer is a working path, a protection path may be set in the layer as described in the following.

1. When an additional protection switching is allowed to be generated in the lower layer because the number of protection switching simultaneously accommodated by the lower layer is less than or equal to the number of protection switching corresponding to an ultimate capacity of the lower layer, the processor 120 may transfer, to the lower layer, path setting information indicating that the protection path is set in both the layer and the upper layer to set a protection path in the lower layer. In such a case, the processor 120 may transfer, to the upper layer, path setting information indicating that a request to set the protection path in the lower layer is made and that the protection switching function is not provided to the layer.

2. When an additional protection switching is not allowed to be generated in the lower layer because the number of protection switching simultaneously accommodated by the lower layer exceeds the number of protection switching corresponding to the ultimate capacity of the lower layer, the processor 120 may not set a protection path in the lower layer. In such a case, the processor 120 may transfer, to the upper layer, path setting information indicating that the protection path is not set in the lower layer.

As described in the foregoing, the process of setting a protection path in a layer may be applicable to a case in which a segment of a layer is broader than or identical to a segment of an upper layer in a network structure including multiple layers.

However, protection switching may also be applicable to a protection domain of a layer in a case that a segment of the protection domain of the layer, which is considered to be a protection segment, is broader than a segment of an upper layer or a segment of an upper domain. That is, when protection switching is needed for a lower layer, although a greater segment cost is consumed in the layer compared to the upper layer by calculating a segment cost or a segment area, a protection path may be set in the lower layer through forced request information for the lower layer irrespective of resource efficiency.

However, despite such a case, when an additional protection switching is not allowed to be generated because the number of protection switching simultaneously accommodated by the layer exceeds the number of protection switching corresponding to the ultimate capacity of the layer, the processor 120 may not set a protection path in the layer and transfer, to the upper layer, path setting information indicating that the protection path is not set in the layer.

As described in the foregoing, the protection switching management method desctibed herein may flexibly apply a protection switching function depending on a request of a user, and set a protection path for a cost-effective operation of a network including multiple layers or multiple domains. In addition, the protection switching management method may minimize unnecessary overlapping protection paths in the network, and effectively apply a protection switching function and automatically set a working path and a protection path in the network.

The storage 130 may store infornzution associated with the protection path set through the processor 120. The information stored in the storage 130 may be used to apply protection switching in a network including multiple layers or multiple domains.

FIG. 5 is a flowchart illustrating a protection switching management method according to an embodiment. The protection switching management method may be performed by a protection switching management apparatus, for example, the protection management apparatus 100 of FIG. 1.

Referring to FIG. 5, in operation 510, the protection switching management apparatus 100 receives an adaptation request from a network component included in an upper layer. The adaptation request indicates a request for adaptation or mapping of the upper layer to a layer that is lower than the upper layer in a network including multiple layers. For example, when a protection switching function is not provided to the layer, a protection path may not be set in the layer, and data may be transmitted and received by being added to a frame of the layer. Conversely, when the protection switching function is provided to the layer, both a working path and a protection path may be set in the layer. Here, the set working path and the set protection path may be considered a single protection group, and the upper layer may consider the protection group to be a lower path and adapt to the lower path.

That is, the adaptation request refers to a request to allow a traffic flow of the upper layer to map a traffic flow of the layer, and to be transferred in the network. Such an adaptation request indicates whether frame information of the upper layer is communicated after the frame is completed through one path (for example, the working path) or the protection group (the working path and the protection path).

In detail, the adaptation request may be made by a network manager or a network management processor in an NMS to a network component. That is, the network manager may make such an adaptation request directly to the network component using a CLI or a GUI to configure a network including multiple layers, or the network management processor may make the adaptation request to the network component via the NMS.

Alternatively, the adaptation request may be made by a network management processor in the network component to a network processor including multiple layers.

Through such an adaptation request, the NMS or the network management processor in the network component may make a request to generate a suitable frame among multiple layers in a network including the multiple layers.

In an adaptation process through the adaptation request, when a bandwidth of the upper layer is smaller than a bandwidth of the layer in consideration of a bandwidth of a traffic flow of each layer, and a bandwidth of a working path of the layer is able to accommodate at least two bandwidths of the upper layer, all the at least two bandwidths of the upper layer may be accommodated by the layer and multiplexed, as necessary. When a difference between the bandwidth of the upper layer and the bandwidth of the layer is not multiplexed, the bandwidth of the upper layer may be mapped to the bandwidth of the layer without the multiplexing.

In operation 520, the protection switching management apparatus 100 determines whether to apply protection switching to the layer based on the received adaptation request. Here, when a network component included in the layer provides a protection switching function to the layer, existing technologies may unconditionally set a protection path in the layer. However, the protection switching management method described herein may adapt the upper layer and the layer by setting only a working path without setting the protection path based on a situation of the network including the multiple layers.

The protection switching management apparatus 100 may determine whether to apply the protection switching to the layer based further on request information received from the upper layer in addition to the received adaptation request of the upper layer. The request information received from the upper layer may be associated with an available resource of the upper layer required to apply protection switching to the upper layer. In detail, the request information may include a bandwidth of the upper layer, information as to whether a protection switching function is provided to the upper layer, path segment information of the upper layer, ultimate capacity information indicating whether the upper layer accommodates simultaneous protection switching, and forced request information to forcefully set the protection path in the layer.

Here, the path segment information may include information on a management point and a destination management point of each network layer, and information on an intermediate management point between the management point and the destination management point. In detail, the path segment information may include an ID of each node in a path segment, a bandwidth of a physical path and a logical path, information on a physical slot and a port through which a path passes in each node, and cost information of a path segment in each network layer.

In a basic network structure and an OAM function, a fault in the layer may simultaneously generate a fault event in the upper layer multiplexed through the adaptation request. The ultimate capacity information indicating whether the upper layer accommodates simultaneous protect on switching indicates a maximum number of protection switching that may be accommodated without exceeding an ultimate capacity of the upper layer in response to occurrence of such a fault event. The ultimate capacity information may be managed for each of an entire end-to-end path and each path segment of protection switching present in each network layer.

The protection switching management apparatus 100 may effectively set the protection path. For example, the protection switching management apparatus 100 may prevent setting an overlapping protection segment based further on path segment information of the upper layer and path segment information of the layer even when a resource exists based on the request information associated with the available resource.

Here, since applying the protection switching to the upper layer is more effective in terms of costs, the protection switching management apparatus 100 may preferentially apply the protection switching to the upper layer. When the number of protection switching of the upper layer exceeds the number of protection switching corresponding to the ultimate capacity of the upper layer, the protection switching management apparatus 100 may prevent applying an additional protection switching to the upper layer, and forceffilly apply the protection switching to the layer.

In operation 530, the protection switching management apparatus 100 sets the protection path in the layer based on a result of determining whether to apply the protection switching to the layer. For example, when the protection switching function is provided to all interworking layers, for example, the upper layer and the layer, and an adaptation request path of the upper layer is a working path, the protection path may be set in the layer as described in the following.

1. When a protection path in an identical segment is previously net in the upper layer and an additional protection switching is allowed to be generated in the upper layer because the number of protection switching simultaneously accommodated by the upper layer is less than or equal to the number of protection switching corresponding to the ultimate capacity of the upper layer, the protection switching management apparatus 100 may set only a working path without setting a protection path in the layer. In such a case, the protection switching management apparatus 100 may avoid setting an overlapping protection path in the layer and allow the upper layer to perform the protection switching. Subsequently, the protection switching management apparatus 100 may transfer, to the upper layer, path setting information indicating that the protection path is not set in the layer but only the working path is set.

2. When a protection path in an identical segment is not set in the upper layer and an additional protection switching is allowed to be generated in the upper layer because the number of protection switching simultaneously accommodated by the upper layer is less than or equal to the number of protection switching corresponding to the ultimate capacity of the upper layer, the protection switching management apparatus 100 may set only a working path without setting a protection path in the layer, and allow a protection group to be generated in the upper layer. In such a case, the protection switching management apparatus 100 may transfer, to the upper layer, path setting information indicating that only the working path is set without setting the protection path in the layer to set a protection path in the upper layer.

3. When a protection path in an identical segment is not set in the upper layer and an additional protection switching is not allowed to be generated in the layer because the number of protection switching simultaneously accommodated by the layer exceeds the number of protection switching corresponding to an ultimate capacity of the layer, the protection switching management apparatus 100 may set only a working path without setting a protection path in the layer. In such a case, the protection switching management apparatus 100 may transfer, to the upper layer, path setting information indicating that only the working path is set without setting the protection path in the layer to set the protection path in the upper layer.

4. When an additional protection switching is not allowed to be generated because the number of protection switching simultaneously accommodated by both the upper layer and the layer exceeds the number of protection switching corresponding to the ultimate capacity, the protection switching management apparatus 100 may not set a protection path in both the two layers. Here, the protection switching management apparatus 100 may transfer, to a further upper layer that is upper than the upper layer or to a lower layer that is lower than the layer, path setting information indicating that the protection path is not set in both the upper layer and the layer to set a protection path in the further upper layer or the lower layer.

For another example, when the protection switching function is provided to all the interworking layers, and the adaptation request path of the upper layer is a protection path, the protection path may be set in the layer as described in the following.

1. Since both a working path and a protection path are previously set in the upper layer, the protection switching management apparatus 100 may set only a working path to avoid overlapping protection of the layer with respect to the protection path of the upper layer. In such a case, the protection switching management apparatus 100 may transfer, to the upper layer, path setting information indicating that only the working path is set without setting the protection path in the layer.

2. In response to a request to forcefully set the protection path in the layer, although both the working path and the protection path are previously set in the upper layer, the protection switching management apparatus 100 may set the protection path along with the working path in the layer with respect to the protection path of the upper layer. In such a case, the protection switching management apparatus 100 may transfer, to the upper layer, path setting information indicating that the protection path is set in the layer.

3. When an additional protection switching is not allowed to be generated because the number of protection switching simultaneously accommodated by the layer exceeds the number of protection switching corresponding to the ultimate capacity of the layer, although both the working path and the protection path are previously set in the upper layer and a request for forcefully setting the protection path in the layer is made, the protection switching management apparatus 100 may set only the working path without setting the protection path in the layer. In such a case, the protection switching management apparatus 100 may transfer, to the upper layer, path setting information indicating that only the working path is set without setting the protection path in the layer.

In a case of a network including multiple layers, the protection switching management apparatus 100 may manage (or verify) whether an adaptation request path from the upper layer or the further upper layer is a protection path, and may follow the process of setting a protection path described in the foregoing when the adaptation request path is the protection path.

For still another example, when the protection switching function is not provided to the upper layer and the protection switching function is provided to the layer, and the adaptation request path of the upper layer is a working path, the protection path may be set in the layer as described in the following.

1. When an additional protection switching is allowed to be generated because the number of protection switching simultaneously accommodated by the layer is less than or equal to the number of protection switching corresponding to the ultimate capacity of the layer, the protection switching management apparatus 100 may set both the working path and the protection path in the layer. In such a case, the protection switching management apparatus 100 may transfer, to the upper layer, path setting information indicating that both the working path and the protection path are set in the layer.

2. When an additional protection switching is not allowed to be generated because the number of protection switching simultaneously accommodated by the layer exceeds the number of protection switching corresponding to the ultimate capacity of the layer, the protection switching management apparatus 100 may set only the working path without setting the protection path in the layer. In such a case, the protection switching management apparatus 100 may transfer, to the upper layer, path setting information indicating that only the working path is set without setting the protection path in the layer to set a protection path in the upper layer.

Here, the protection switching management apparatus 100 may transfer, to the further upper layer that is upper than the upper layer or the lower layer that is lower than the layer, path setting information indicating that the protection path is not set in both the layer and the upper layer to set a protection path in the further upper layer or the lower layer.

For yet another example, when the protection switching function is not provided to the layer and the protection switching function is provided to the lower layer, and the adaptation request path of the upper layer is a working path, the protection path may be set in the layer as described in the following.

1. When an additional protection switching is allowed to be generated in the lower layer because the number of protection switching simultaneously accommodated by the lower layer is less than or equal to the number of protection switching corresponding to an ultimate capacity of the lower layer, the protection switching management apparatus 100 may transfer, to the lower layer, path setting information indicating that the protection path is not set in both the layer and the upper layer to set a protection path in the lower layer. In such a case, the protection switching management apparatus 100 may transfer, to the upper layer, path setting information indicating that a request for setting the protection path in the lower layer is made and that the protection switching function is not provided to the layer.

2. When an additional protection switching is not allowed to be generated in the lower layer because the number of protection switching simultaneously accommodated by the lower layer exceeds the number of protection switching corresponding to the ultimate capacity of the lower layer, the protection switching management apparatus 100 may not set the protection path in the lower layer. In such a case, the protection switching management apparatus 100 may transfer, to the upper layer, path setting information indicating that the protection path is not set in the lower layer.

As described in the foregoing, the process of setting a protection path in a layer may be applicable to a case in which a segment of the layer is broader than or identical to a segment of an upper layer in a network structure including multiple layers.

However, protection switching may also be applicable to a layer or a protection domain in a case that a segment of the layer or a segment of the protection domain, which is considered to be a protection segment, is broader than a segment of an upper layer or a segment of an upper domain. That is, when protection switching is needed for a lower layer, although a greater segment cost is consumed in the layer compared to the upper layer by calculating a segment cost or a segment area, a protection path may be set in the lower layer through forced request information for the lower layer irrespective of resource efficiency.

However, despite such a case, when an additional protection switching is not allowed to be generated because the number of protection switching simultaneously accommodated by the layer exceeds the number of protection switching corresponding to an ultimate capacity of the layer, the protection switching management apparatus 100 may not set the protection path in the layer and transfer, to the upper layer, path setting information indicating that the protection path is not set in the layer.

As described in the foregoing, the protection switching management apparatus 100 may flexibly apply a protection switching function depending on a request of a user, and set a protection path for a cost-effective operation of a network including multiple layers or multiple domains. In addition, the protection switching management apparatus 100 may minimize unnecessary overlapping protection paths in the network, and effectively apply a protection switching function and automatically set a working path and a protection path in the network.

In operation 540, the protection switching management apparatus 100 transmits, to the upper layer or the lower layer, information associated with the protection path set in the layer. Here, the information associated with the protection path, which is to be transmitted, may include information as to whether the protection path is set in the layer, and request information indicating a request for setting a protection path in the further upper layer or the lower layer, as necessary.

According to example embodiments described herein, a protection switching management apparatus and method for effective use of resources in a multilayer or a multi-domain may cost-effectively apply a protection switching function to a network in which multiple layers or multiple domains interwork with one another.

The above-described embodiments of the present disclosure may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tapes; optical media such as CD ROMs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present disclosure, or vice versa.

Although a few embodiments of the present disclosure have been shown and described, the present disclosure is not limited to the described example embodiments. Instead, it would be appreciated by those skilled in the art that changes may be made to these embodiments without departing from the principles and spirit of the disclosure, the scope of which is defined by the claims and their equivalents.

Therefore, the scope of the present disclosure is defined not by the detailed description, but by the claims and their equivalents, and all variations within the scope of the claims and their equivalents are to be construed as being included in the disclosure.

What is claimed is:

1. A protection switching management method, comprising:
   receiving a request from a network component comprised in an upper layer;
   determining whether to apply protection switching to a layer based on the received request; and
   setting a protection path in the layer based on a result of the determining,
   wherein the determining comprises:
   determining whether to apply the protection switching to the layer based further on request information received from the upper layer in addition to the received request,
   wherein the request information is associated with an available resource of the upper layer required for applying the protection switching, and
   wherein the request information comprises a bandwidth of the upper layer, information as to whether a protection switching function is provided to the upper layer, path segment status of the upper layer, capacity information indicating whether the upper layer accommodates simultaneous protection switching, and forced request information to forcefully set the protection path in the layer.

2. The method of claim 1, wherein the determining comprises:
   preferentially applying the protection switching to the upper layer over the layer; and
   applying the protection switching to the layer when the number of protection switching simultaneously accommodated by the upper layer exceeds the number of protection switching corresponding to capacity information.

3. The method of claim 1, wherein the determining comprises:
   determining whether to apply the protection switching to the layer based further on capacity information of each of the upper layer and the layer based on whether a protection switching function is provided to the upper layer and the layer and on request path of the upper layer.

4. The method of claim 1, wherein, when a protection switching function is not provided to the layer and a lower layer to which the protection switching function is provided exists, the setting comprises:
   setting a protection path in the lower layer.

5. The method of claim 1, further comprising:
   transferring information associated with the protection path set in the layer to the upper layer or a lower layer.

6. A protection switching management apparatus, comprising:
   a receiver configured to receive request from a network component comprised in an upper layer;
   a processor configured to determine whether to apply protection switching to a layer based on the received request, and set a protection path in the layer based on a result of the determining; and
   a storage configured to store information associated with the set protection path,
   wherein the processor is configured to determine whether to apply the protection switching to the layer based further on request information received from the upper layer in addition to the received request,
   wherein the request information is associated with an available resource of the upper layer required for applying the protection switching, and
   wherein the request information comprises a bandwidth of the upper layer, information as to whether a protection switching function is provided to the upper layer, path segment status of the upper layer, capacity information indicating whether the upper layer accommodates simultaneous protection switching, and forced request information to forcefully set the protection path in the layer.

7. The apparatus of claim 6, wherein the processor is configured to preferentially apply the protection switching to the upper layer over the layer, and apply the protection switching to the layer when the number of protection switching simultaneously accommodated by the upper layer exceeds the number of protection switching corresponding to capacity information.

8. The apparatus of claim 6, wherein the processor is configured to determine whether to apply the protection switching to the layer based further on capacity information of each of the upper layer and the layer based on whether a protection switching function is provided to the upper layer and the layer and on an adaptation request path of the upper layer.

9. The apparatus of claim 6, wherein, when a protection switching function is not provided to the layer and a lower layer to which the protection switching function is provided exists, the processor is configured to set a protection path in the lower layer.

* * * * *